United States Patent [19]

Nakajima et al.

[11] Patent Number: 5,521,633
[45] Date of Patent: May 28, 1996

[54] MOTOR VEHICLE OBSTACLE MONITORING SYSTEM USING OPTICAL FLOW PROCESSING

[75] Inventors: Masato Nakajima, Tokyo; Takahiro Fujishiro, Kanagawa; Norio Kitamura, Shizuoka; Kazuyuki Sasaki, Shizuoka; Takahiro Oikawa, Shizuoka; Kouji Ishii, Shizuoka, all of Japan

[73] Assignee: Yazaki Corporation, Tokyo, Japan

[21] Appl. No.: 126,298

[22] Filed: Sep. 24, 1993

[30] Foreign Application Priority Data

Sep. 25, 1992 [JP] Japan ................................. 4-256268
Aug. 6, 1993 [JP] Japan ................................. 5-196186

[51] Int. Cl.$^6$ ................................................. H04N 7/18
[52] U.S. Cl. ........................ 348/118; 348/148; 364/424.01
[58] Field of Search ................................. 348/113, 114, 348/116, 118, 119, 148, 143, 149, 169, 172, 171, 170; 364/424.01, 424.02

[56] References Cited

U.S. PATENT DOCUMENTS

| 4,926,346 | 5/1990 | Yokoyama | 364/518 |
|---|---|---|---|
| 4,970,653 | 11/1990 | Kenue | 348/118 |
| 4,985,847 | 1/1991 | Shioya et al. | 364/516 |
| 5,128,874 | 7/1992 | Bhanu et al. | 364/461 |
| 5,139,327 | 8/1992 | Tanaka | 348/148 |
| 5,249,128 | 9/1993 | Markandey et al. | 364/426.04 |
| 5,257,209 | 10/1993 | Markandey | 364/516 |
| 5,265,172 | 11/1993 | Markandey et al. | 382/17 |
| 5,291,207 | 3/1994 | Kikuchi et al. | 342/70 |
| 5,410,346 | 4/1995 | Saneyoshi et al. | 348/116 |

FOREIGN PATENT DOCUMENTS

| 3619824 | 12/1987 | Germany. | |
|---|---|---|---|
| 3642196 | 6/1988 | Germany. | |
| 3636946 | 6/1988 | Germany. | |
| 4107177 | 9/1991 | Germany. | |
| 2-241855 | 9/1990 | Japan | B60R 21/00 |
| 3-118613 | 5/1991 | Japan | G05D 1/02 |

OTHER PUBLICATIONS

"Computer am Ruder," mot–Technik, Jul. 1990, pp. 120–123, 126–127, 130.
"Der Computer als Chauffeur," ELO, Nov. 1988, pp. 56–58.

Primary Examiner—Tommy Chin
Assistant Examiner—Bryan S. Tung
Attorney, Agent, or Firm—Sughrue, Mion, Zinn, Macpeak & Seas

[57] ABSTRACT

A monitoring method for moving vehicles allows the presence of danger to be determined from the magnitude of an optical flow vector. The optical flow vector is detected as a movement of a single point on an object taken over two images, with one image taken at a preceding time and the other image taken at succeeding time in a series of images. A long and narrow window set in a radial direction from a focus of expansion (FOE) of the earlier image is moved in the same direction on the latter image. An optical flow vector of a target point is defined by a vector connecting the midpoint of a location of a subsequent window and the midpoint of a location at which the long and narrow window is set in the earlier image. The location of the subsequent window is determined by minimizing the sum of absolute values of differences in luminance between the long and narrow window and an area of the latter image overlapping such long and narrow window. The optical flow calculation area is limited to areas in which a difference in luminance between the earlier and latter images exceeds a predetermined threshold, and any influence from scenes outside the road boundaries and from lane-dividing lines or other symbols drawn on the road surface is removed in calculating the optical flow.

9 Claims, 6 Drawing Sheets

MOTOR VEHICLE OBSTACLE MONITORING SYSTEM USING OPTICAL FLOW PROCESSING

BACKGROUND OF THE INVENTION

The invention relates to a front, side or rear view monitoring method for a motor vehicle (such as an automobile) which can warn a driver by using images taken by a video camera installed on the front, side or rear part of the motor vehicle and sensing a motor vehicle or an obstacle ahead of the driver's own motor vehicle during a drive.

A conventional method of this type is disclosed in a publication of Japanese Unexamined Patent Publication No. 241855/1990. The method disclosed in the publication comprises the steps of: picturing a front view from a driver's own motor vehicle that is moving; recognizing a movement of a single point in the pictured front view as an optical flow at predetermined times; gathering information, i.e., the position of a preceding motor vehicle relative to the driver's own motor vehicle and the relative speed, based on the optical flow as well as on the distance of the preceding motor vehicle as measured by a range sensor; and warning the driver of danger when the presence of danger is judged.

Figure 10A:
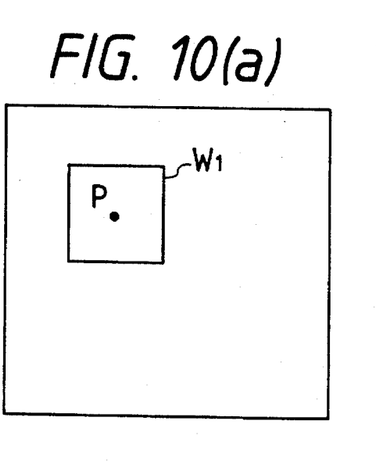
FIGS. 10(a) and 10(b) are diagrams illustrative of problems encountered by a conventional method.
Figure 10B:
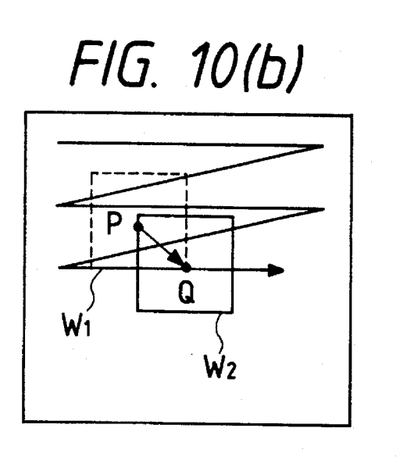

To calculate the optical flow, a method called a matching method has here ore been adopted. The matching method detects a corresponding point in two images. The matching method comprises the steps of: setting a window W1 for a target pixel P in an image at a time t, as shown in FIG. 10 (a); calculating a correlative value while moving the window over the entire part of the image or a neighboring area; and finding a corresponding point in a window W2 defined at the time the correlative value is maximized, i.e., a pixel Q, as shown in FIG. 10 (b). An arrow PQ indicates an optical flow. To calculate the above-mentioned correlative value, the following equation is used.

$$\Sigma(W1_{(x,y)} \times W2_{(x,y)})/(\Sigma W1^2_{(x,y)} \times \Sigma W2^2_{(x,y)})^{1/2} \quad (1)$$

where $W1_{(x,y)}$, $W2_{(x,y)}$ are the outputs of coordinates (x, y) within the windows W1, W2.

However, in order to judge danger, the conventional method requires a range sensor for measuring the distance of a preceding motor vehicle to identify the position of the preceding motor vehicle relative to the driver's own motor vehicle, in addition to a video camera for picturing the front view.

Further, in order to calculate the optical flow, the operation of detecting the corresponding point in an image must be performed. As described above, such operation comprises detection of all the pixels in the entire part or a neighboring area of the image relative to a single pixel within the image to find a single corresponding point. To detect the corresponding point over the entire part of the image, this operation must be performed on all the pixels. In addition, a great number of calculations are required to be performed to find correlative values that are to be used as indexes for search.

Therefore, an increased volume of calculation makes realtime processing impossible. For achievement of the realtime processing, a high-speed processor is required, which elevates hardware costs. Further, it is not easy to distinguish the source of an optical flow; e.g., whether the optical flow is derived from the preceding motor vehicle or from scenes outside the road, or characters, symbols, or white lines on the road surface, or the like.

SUMMARY OF THE INVENTION

The invention has been made in view of the above circumstances. Accordingly, an object of the invention is to provide a front, side or rear view monitoring method for a motor vehicle capable of automatically judging the rate of danger of a preceding motor vehicle or other obstacles in the front, side or rear while using front, side or rear view images monitored by a video camera installed in the front, side or rear part of the motor vehicle without measuring the distance between the preceding motor vehicle and the driver's own motor vehicle.

Further, another object of the invention is to provide a front, side or rear view monitoring method for a motor vehicle capable of quickly identifying a movement of the same point in a front, side or rear view pictured by the video camera at predetermined intervals of time as an optical flow.

To achieve the above objects, a first aspect of the invention is applied to a front, side or rear view monitoring method for a motor vehicle, which is characterized as comprising the steps of: picturing a front, side or rear view from a driver's own motor vehicle that is running; detecting a movement of a single point in two images as an optical flow, one image of the two images being taken at a preceding time and the other image of the two images being taken at a succeeding time; and monitoring a correlation of the driver's own motor vehicle with a preceding motor vehicle or an obstacle on a road. In such a front, side or rear view monitoring method, a rate of danger is judged depending on the magnitude and the location of a vector of an optical flow derived from a point on the preceding motor vehicle or the obstacle on the road.

A second aspect of the invention is applied to the above-mentioned front, side or rear view monitoring method for a motor vehicle, which is further characterized as comprising the steps of: setting a long and narrow window in the image taken at the preceding time out of the two images, the long and narrow window extending in a radial direction relative to a single target point from an infinite point corresponding to a single point indicating an advancing direction of the driver's own motor vehicle that is running; calculating a sum of absolute values of differences in luminance between the long and narrow window of the image taken at the preceding time and an area of the other image taken at the succeeding time, the area of the other image overlapping the long and narrow window, while moving the long and narrow window in the radial direction from the infinite point in the other image taken at the succeeding time; and defining an arrow as an optical flow for the single target point, the arrow connecting a midpoint of a location of a window obtained at the time the sum is minimized and a midpoint of a location of the long and narrow window set in the image taken at the preceding time.

A third aspect of the invention is applied to the above-mentioned front, side or rear view monitoring method for a motor vehicle, which is further characterized as comprising the steps of: calculating differences in luminance of the respective points between the two images; and calculating optical flows of only points for which the differences in luminance exceed a predetermined threshold.

A fourth aspect of the invention is applied to the above-mentioned front, side or rear view monitoring method for a motor vehicle, which is further characterized as comprising the step of: removing optical flows derived from scenes outside the road, lane-dividing lines, characters, symbols or the like drawn on a road surface in calculating an optical flow.

A fifth aspect of the invention is characterized as comprising the steps of: presetting areas corresponding to scenes outside a road; and not processing the preset areas when an optical flow is calculated.

A sixth aspect of the invention is characterized as comprising the steps of: calculating a height from a lane-dividing line, a character, a symbol or the like on a road surface from which an optical flow is derived to a video camera based on optical flow data using the video camera for picturing a front, side or rear view from the driver's own motor vehicle that is running; and removing an optical flow for which the height from the road surface coincides with a height of the video camera.

A seventh aspect of the invention is characterized as comprising the steps of: dividing a predetermined area into a plurality of zones; weighting a sum of lengths of optical flow vectors present in each zone on a zone basis; and judging a rate of danger from a magnitude of the weighted value.

An eighth aspect of the invention is characterized as comprising the steps of: setting a predetermined threshold for each of the respective zones; and judging that a zone in which the sum of the lengths of the optical flow vectors exceeds the predetermined threshold is dangerous.

A ninth aspect of the invention is characterized as comprising the step of: judging a level of the rate of danger from levels of each threshold having exceeded the sum of the lengths of optical flow vectors by setting a plurality of levels to the threshold.

A tenth aspect of the invention is characterized as comprising the step of: giving an alarm in accordance with the calculated magnitude of the rate of danger.

Paying attention to the fact that the smaller the distance between the driver's own motor vehicle and the preceding motor vehicle or obstacle, or the greater the relative speed is, the greater the optical flow becomes, the method of the invention is designed to judge danger from the magnitude of an optical flow derived from a point on a preceding motor vehicle or obstacle on the road. Therefore, it is not particularly necessary to install a range finder for measuring the distance of the preceding motor vehicle.

Paying attention to the fact that optical flows are formed in radial directions from a point of infinity (focus of expansion FOE) corresponding to a single point that indicates an advancing direction of a driver's own motor vehicle, the method of the invention is designed to comprise the steps of: setting a long and narrow window in the image taken at the preceding time out of the two images, the long and narrow window extending in a radial direction relative to a single target point from an infinite point corresponding to a single point indicating an advancing direction of the driver's own motor vehicle that is running; calculating a sum of absolute values of differences in luminance between the long and narrow window of the image taken at the preceding time and an area of the other image taken at the succeeding time, the area of the other image overlapping the long and narrow window, while moving the long and narrow window in the radial direction from the infinite point in the other image taken at the succeeding time; and defining an arrow as an optical flow for the single target point, the arrow connecting a midpoint of a location of a window obtained when the sum is minimized and a midpoint of a location of the long and narrow window set in the image taken at the preceding time. Therefore, the volume of calculation can be reduced, which contributes to implementing high-speed processing.

Paying attention to the fact that there are locations whose luminances are not subject to change with time such as the sky and a road surface included in an image, the method of the invention is designed to comprise the steps of: calculating differences in luminance of the respective points between the two images; and calculating optical flows of only points for which the differences in luminance exceed a predetermined threshold. Therefore, the number of points within the image for which optical flows must be calculated is significantly reduced, which contributes to saving wasteful processing and thereby implementing high-speed processing.

In calculating an optical flow, the method of the invention is designed to comprise the step of presetting areas corresponding to scenes outside a lane in which to run, and then not processing the preset areas. Therefore, high-speed processing can be implemented.

The method of the invention is designed to comprise the steps of: calculating a height from a lane-dividing line, a character, a symbol or the like on a road surface from which an optical flow is derived to a video camera based on optical flow data using the video camera for picturing a front, side or rear view from the driver's own motor vehicle that is running; and removing an optical flow for which the height from the road surface coincides with a height of the video camera. Therefore, the optical flow that is derived from only the preceding motor vehicle or obstacle can be processed, thereby not only allowing the rate of danger to be detected based on the optical flow, but also contributing to implementing high-speed processing.

The method of the invention is designed to comprise the steps of: dividing a predetermined area into a plurality of zones; weighting a sum of lengths of optical flow vectors present in each zone on a zone basis; and judging a rate of danger from a magnitude of the weighted value. Therefore, the specific location in which danger is present can be judged. Further, the method of the invention is designed to comprise the steps of: setting a predetermined threshold for each of the respective zones; and judging that a zone in which the sum of the lengths of the optical flow vectors exceeds the predetermined threshold is dangerous. Therefore, the rate of danger can be judged on a zone basis. Still further, the method of the invention is designed to comprise the steps of: judging a level of the rate of danger from levels of each threshold having exceeded the sum of the lengths of optical flow vectors by setting a plurality of levels to the threshold; and giving an alarm in accordance with the calculated magnitude of the rate of danger.

BRIEF DESCRIPTION OF THE PREFERRED EMBODIMENTS

DETAILED DESCRIPTION OF THE PREFERRED EMBODIMENTS

Figure 1:
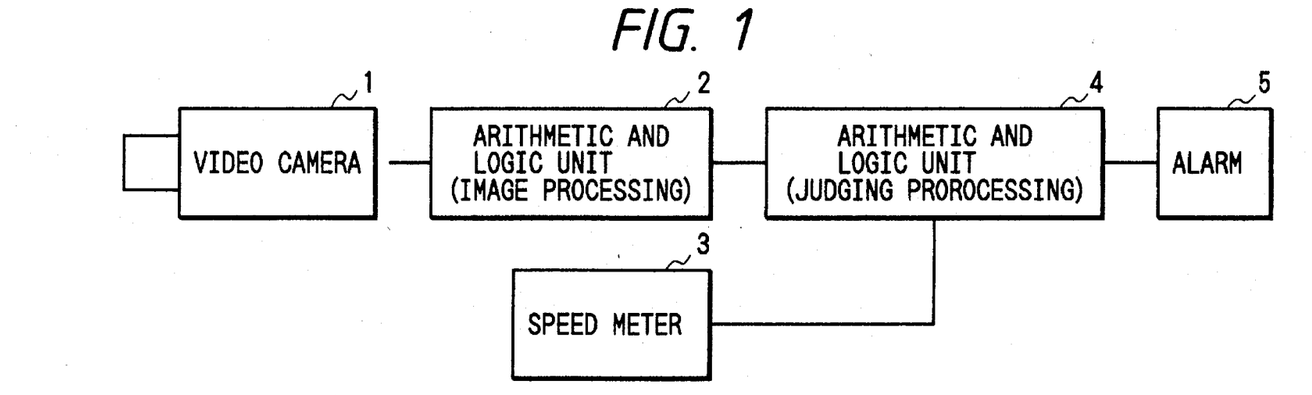
FIG. 1 is a block diagram showing an exemplary apparatus for embodying a method of according to the invention.

An embodiment of the invention will now be described with reference to the drawings. FIG. 1 shows a configuration of an apparatus in which a method according to the invention is embodied. In FIG. 1, reference numeral 1 designates a video camera for picturing, e.g., a front view from a motor vehicle; 2, an arithmetic and logic unit for executing image processing (described later) upon receiving an image obtained by the video camera 1; 3, a speedometer for measuring the speed of the motor vehicle; 4, an arithmetic and logic unit for executing danger judging processing by receiving the image processing result obtained by the arithmetic and logic unit 2 and the speed of the motor vehicle obtained by the speedometer 3; and 5, an alarm.

Figure 2A:
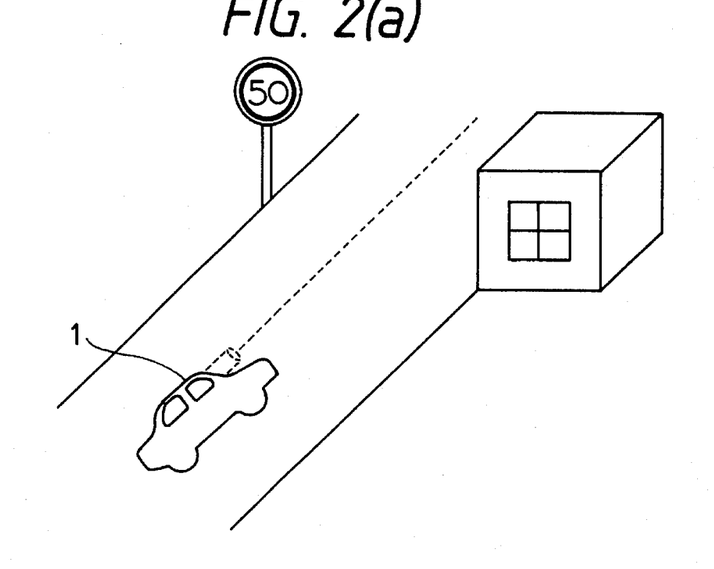
FIGS. 2(a) to 2(d) are diagrams showing a front view and images to be pictured by a video camera, and resulting optical flows.
Figure 2B:
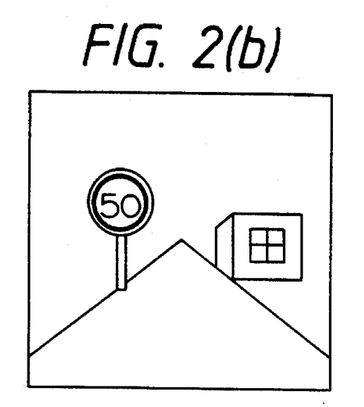
Figure 2C:
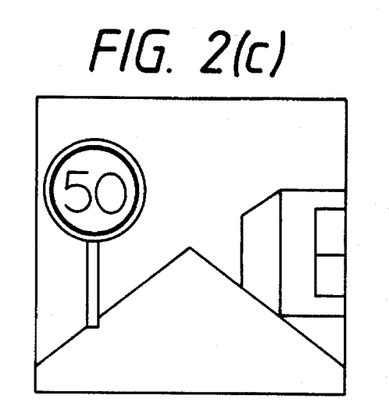

FIGS. 2(a) to 2(d) are diagrams illustrative of a change in a front view image obtained by the video camera 1. FIG. 2(b) depicts an image taken by the video camera 1 at a time t in the situation illustrated in FIG. 2(a), which includes the driver's own motor vehicle; and FIG. 2(c) is an image taken at a time t+Δt.

Figure 2D:
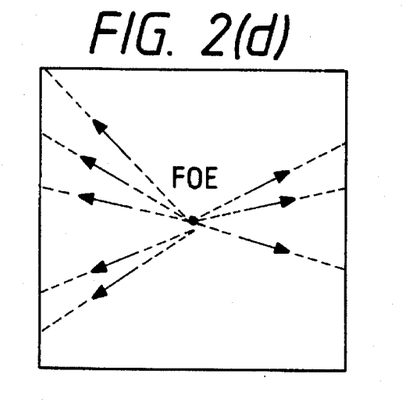

Let it now be assumed that the driver's motor vehicle is moving straight ahead on a flat road. If the video camera is focused on a road sign and a building such, as shown in FIG. 2(a), then images shown in FIGS. 2(b) and 2(c) are taken at a time t and at a time t+Δt as the time elapses. When corresponding points in these two images are searched and connected, speed vectors such as are shown in FIG. 2(d) can be obtained. These vectors are what is termed "optical flows".

These optical flows appear radially from a single point called a focus of expansion (FOE) within an image. The term FOE is also called an infinite point or disappearing point, and corresponds to a single point on the image, the single point indicating the advancing direction of the driver's own motor vehicle if the motor vehicle is moving straight ahead. Accordingly, the optical flows to be obtained when the driver's own motor vehicle is cruising are in radial directions from the FOE. Optical flows derived from a preceding motor vehicle include information such as the distance of the preceding motor vehicle relative to the driver's own motor vehicle and the relative speed. It is assumed that the longer the optical flows are, the greater the degree of danger becomes.

Figure 3:
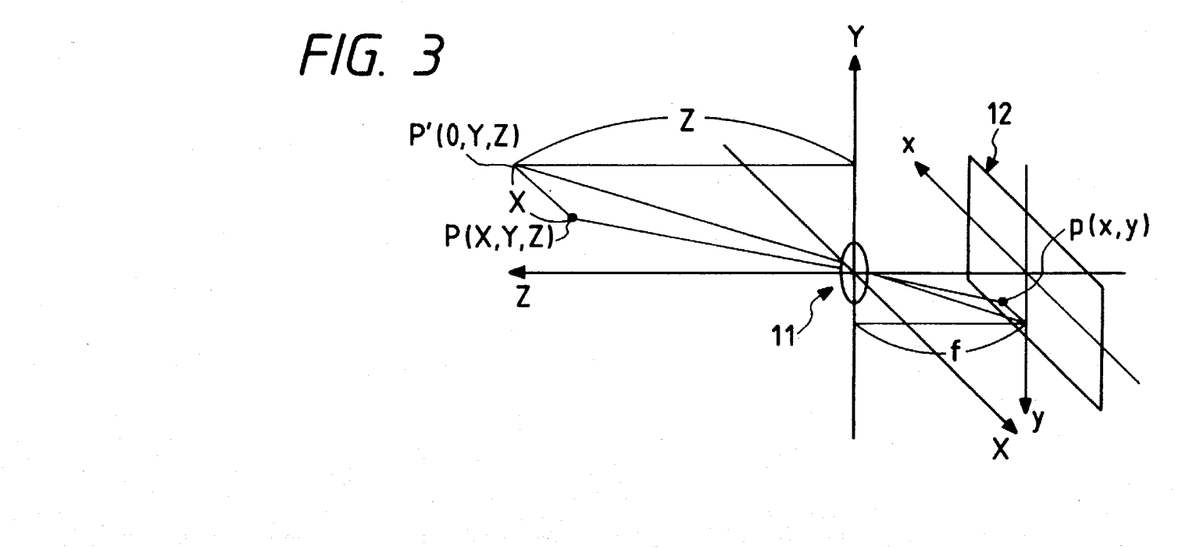
FIG. 3 is a diagram illustrative of how an obstacle or the like is detected by the method of according to the invention.

Details of the method will be described with reference to FIG. 3. Assuming that, in the optical configuration of FIG. 3, reference character 11 designates a lens of the video camera; 12, an image plane of the video camera; f, a distance from the lens 11 to the image plane 12; P (X, Y, Z), an arbitrary point on a preceding motor vehicle or on an obstacle; and p, a point on the image plane 12 corresponding to the point P, then $$x = f \cdot X/Z \tag{2}$$

from the ratio of similarity between triangles.

When equation (2) is modified and differentiated by time, $$X' = (\Delta x/\Delta t \cdot Z + x \cdot Z')/f \tag{3}$$

is obtained. Since a component u in the direction of x of the optical flow is $$u = \Delta x/\Delta t \tag{4}$$

Thus, using equation (4), $$Z = (f \cdot X' - x \cdot Z')/u \tag{5}$$

is obtained.

Here, since $$Z' = \text{a relative speed between the preceding motor vehicle or the obstacle and the driver's own motor vehicle} = -\alpha \tag{6}$$

the above equation (5) can be rewritten to $$Z = (f \cdot X' + x\alpha)/u \tag{7}$$

Therefore, the component u in the X direction of the optical flow becomes $$u = (f \cdot X' + x\alpha)/Z \tag{8}$$

The same applies to Y.

Hence, from the above equation (8), the smaller Z is (i.e., the smaller the distance to the preceding motor vehicle or the obstacle is), or the greater α is (i.e., the greater the relative speed with respect to the preceding motor vehicle is), the greater the x component of the optical flow becomes. The same is true for the Y direction.

Therefore, the optical flow becomes longer with smaller distances with respect to the preceding motor vehicle, etc. or with greater relative speeds. As a result, it is assumed that the longer the optical flow is, the relatively greater the rate of danger with respect to the preceding motor vehicle or the obstacle becomes.

Figure 4A:
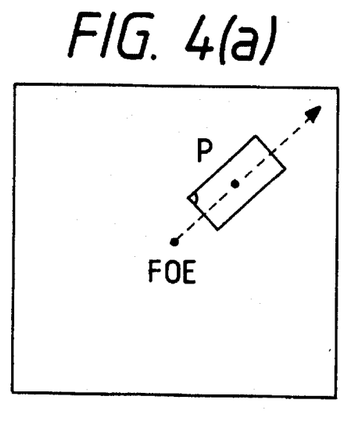
FIGS. 4(a) and 4(b) are diagrams illustrative of how an optical flow is calculated by the method of the invention.
Figure 4B:
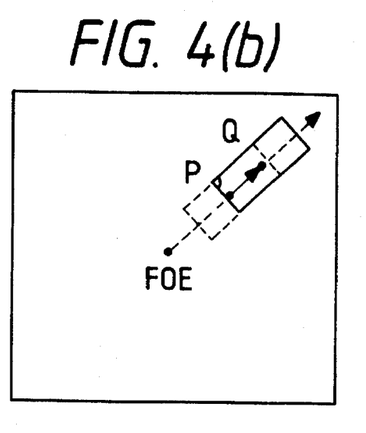

The invention is designed to calculate optical flows at high speeds while utilizing the fact that optical flows can be found in radial directions from the FOE. A method of calculating an optical flow will be described next with reference to FIG. 4.

FIGS. 4(a) and 4(b) are diagrams illustrative of an exemplary method of calculating an optical flow at high speeds. First, a long and narrow window is set in a radial direction from the FOE with respect to a single point targeted in an image at time t (FIG. 4(a)). Then, in an image at time t+Δt, the sum of absolute values of differences in luminance between the window at time t and the window at time t+Δt is calculated while moving the window at time t in the radial direction point by point from the FOE. A window moving distance at the time the sum takes the minimum value is calculated as a speed vector of the target point (FIG. 4(b)). The differences in luminance are between the respective pixels forming the window, e.g., between the pixels encircled in FIGS. 4(a) and 4(b). The optical flows of the entire part of the image can be obtained by repeating the above processing for all the points on the image at time t.

A conventional method employs mutual correlative values in comparing the corresponding windows. In contradistinction thereto, the method according to the invention, characterized as using the sum of the absolute values of differences in luminance, can reduce the volume of calculation, thereby improving the processing speed.

With respect to the speed vector, the processing of the invention is characterized as first calculating differences in luminance between an image at time t and an image at time t+Δt and then processing only points for which such differences exceed a predetermined threshold, instead of finding the speed vector for all the points within the image.

Generally, front view images taken by a video camera while a motor vehicle is moving include, in most cases, locations undergoing few changes in luminance over a period of time, such as the sky and a road. It is, in principle, impossible to determine optical flows in such locations. Therefore, the above-described method contributes to dispensing with wasteful processing and thus facilitates time-saving.

Optical flows can be obtained by the above-mentioned method quickly. The optical flows obtained hereby include those derived from objects other than obstacles, such as structures off to the side of the road and lane-dividing lines on the road surface. Therefore, it is difficult to evaluate the presence of an obstacle in the front or the rate of danger caused by such obstacle using such optical flows. Hence, it is necessary to remove the optical flows derived from the scenes on either side of the road and the lane-dividing lines on the road surface. A method of performing such processing will be described next.

Figure 5:
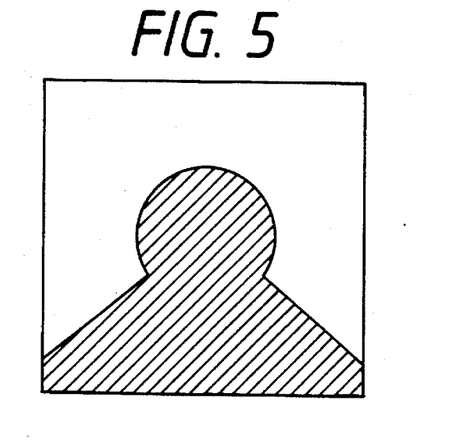
FIG. 5 is a diagram showing an exemplary area set so that the optical flow can be calculated by the method of the invention.

FIG. 5 shows an exemplary method of removing optical flows derived from scenes outside the road's boundaries. In FIG. 5, the shaded portion indicates a location on the road, and it is assumed that no processing will be executed at areas other than such location. This is a technique for isolating optical flows derived from scenes beyond the road from the outset of the processing. Such a technique, by limiting the area subjected to processing, serves the purpose of improving processing time.

Figure 6:
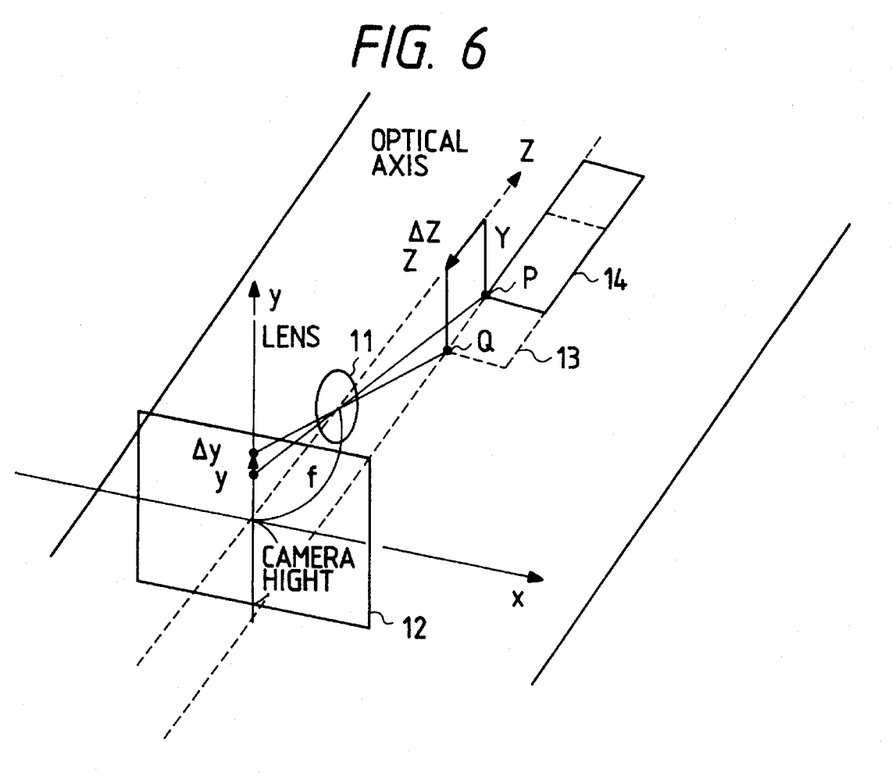
FIG. 6 is a diagram illustrative of how the optical flow derived from a lane-dividing line on a road surface is eliminated by the method of the invention.

Then, a method of deleting marks on the road surface will be described with reference to FIG. 6. FIG. 6 shows an exemplary method. An optical configuration will be described first. FIG. 6 is depicted, assuming that the entire road surface is approaching a stationary motor vehicle equipped with a video camera, instead of such motor vehicle moving straight ahead on the road surface. Reference numeral 11 designates a lens of the video camera for imaging a front view; 12, an image plane of the video camera; 13 and 14, lane-dividing line portions before and after the motor vehicle has moved. Both three-dimensional coordinates with the center of the lens as the origin and two-dimensional coordinates with the above-mentioned FOE as the origin are considered.

If it is assumed that a location of the lane-dividing line portion before the movement is P (X, Y, Z+ΔZ) and that a location thereof after a movement of ΔZ in the Z direction is Q (X, Y, Z), then the ratio of similarity between two triangles can determine the height between the lane-dividing line from which an optical flow is derived and the video camera according to an equation (9).

$$Y = y^2 \Delta Z / f \Delta y \quad (9)$$

Using the height data thus obtained, optical flows derived from marks or the like on the road surface, whose heights are equal to the height of the video camera, can be deleted.

Here, ΔZ is the distance by which the motor vehicle has advanced during a time interval Δt between the two images. This data can be calculated if the speed of the motor vehicle is known. By the thus described processing, the optical flows derived from objects other than obstacles in the front can be removed. Thus, the rate of danger, which indicates the degree of danger of an obstacle in the front, can be calculated from the positions and lengths of optical flows that have been left after the removal.

Figure 7:
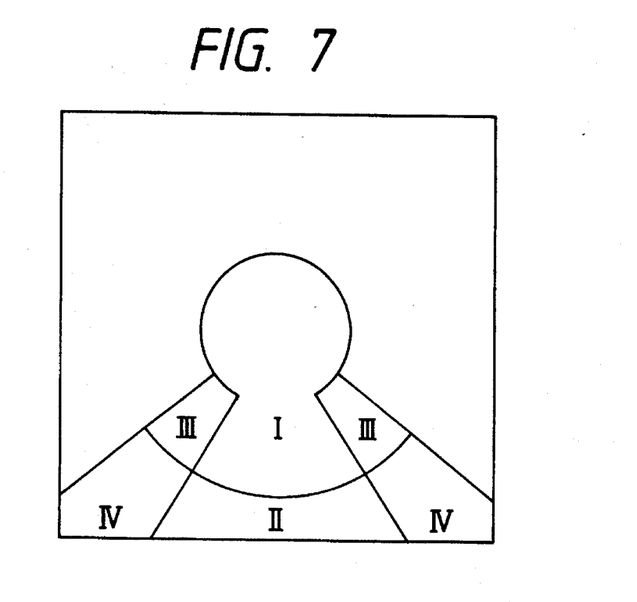
FIG. 7 is a diagram showing exemplary zones defined so that the rate of danger can be judged by the method of the invention.

Then, a method of calculating the rate of danger will be described. FIG. 7 shows an exemplary method. The general configuration will be described first. Reference characters I to IV are zones respectively indicating the near part of the driver's lane, the distant part thereof, and the near part of an adjacent lane. The rate of danger is assessed by using the value obtained by weighting on a zone basis the sum of the lengths of optical flows present in each zone. Further, a predetermined threshold is defined for each zone, so that when the sum of the lengths of the optical flows present in a zone exceeds the threshold, such zone is judged to be dangerous. The danger can be evaluated according to level by setting a plurality of levels of thresholds.

As the last step, the driver may be alerted to danger by an alarm in accordance with the magnitude of the evaluated rate of danger. The rate of danger may be indicated on a display by the zone. Also, the tone of the alarm may be used to distinguish between levels of danger.

Figure 8:
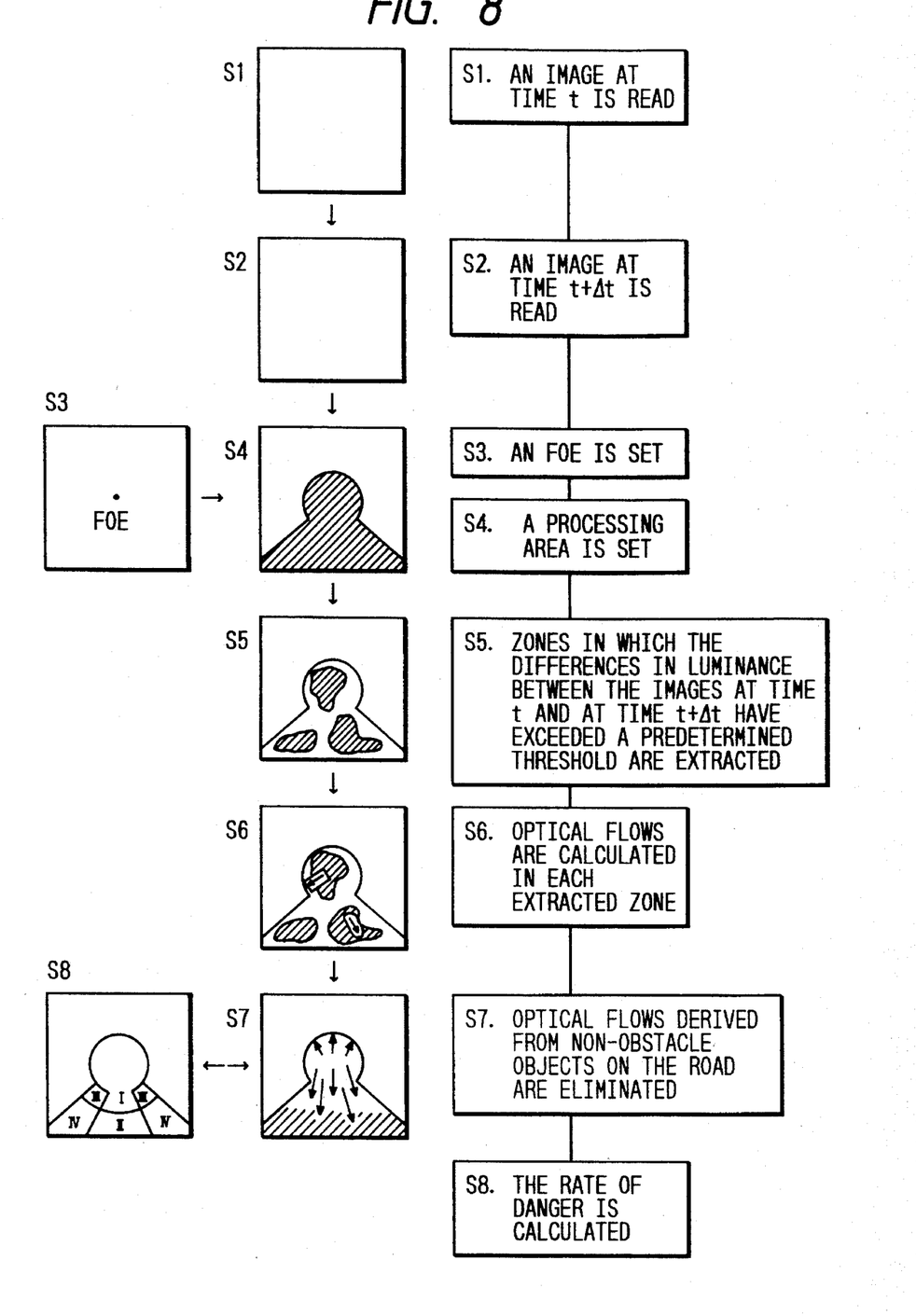
FIG. 8 is a diagram showing a series of processing steps comprised in the method according to the invention.

FIG. 8 summarizes the procedure of the above-mentioned image processing performed by the method according to the invention. In Step S1 an image at time t is read, and in Step 2 an image at t+Δt is read. Then, in Step S3 an FOE is set, and in Step S4 a processing area is set. Successively, in Step S5, zones in which the differences in luminance between the images at time t and at time t+Δt have exceeded a predetermined threshold are extracted. In Step S6 optical flows are calculated in each extracted zone, and in Step S7 optical flows derived from non-obstacle objects on the road are eliminated. In Step S8 the rate of danger is calculated using the zone-based weighted value.

Figure 9A:
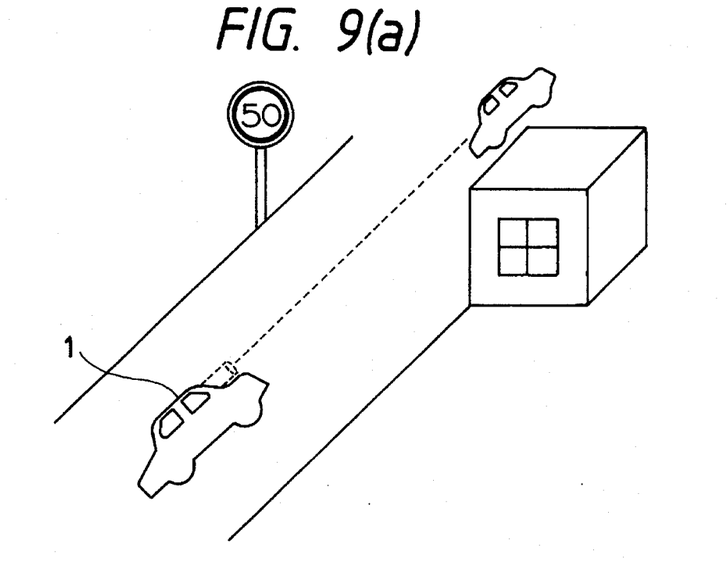
FIGS. 9(a) to 9(d) are diagrams showing a rear view, images to be pictured by a video camera, resultant optical flows.
Figure 9B:
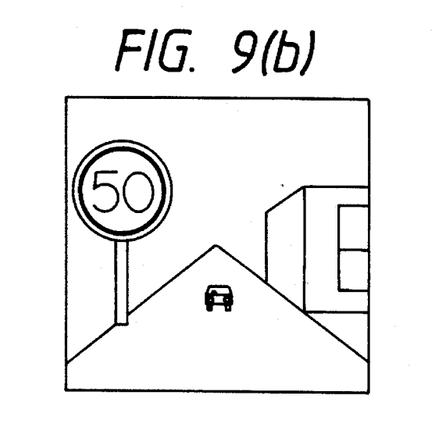
Figure 9C:
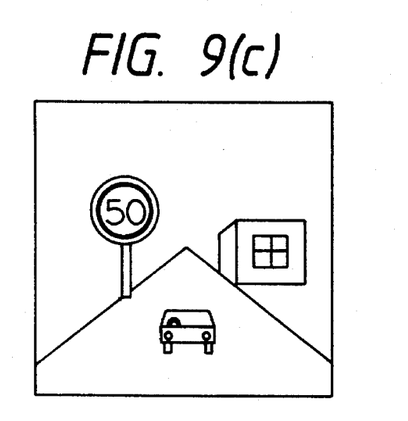

In the above-mentioned embodiment of the present invention, an example of the front view monitoring method for motor vehicle has been described. However, the present invention can be also utilized as a side or rear view monitoring method for a motor vehicle by providing a video camera for picturing a side view or a rear view. FIGS. 9(a) to 9(d) are diagrams illustrative of a change in a rear view image obtained by the video camera 1. FIG. 9(b) illustrates an image taken by the video camera 1 at a time t in the situation shown in FIG. 9(a), which includes the driver's own motor vehicle; and FIG. 9(c) is an image taken at a time t+Δt.

Figure 9D:
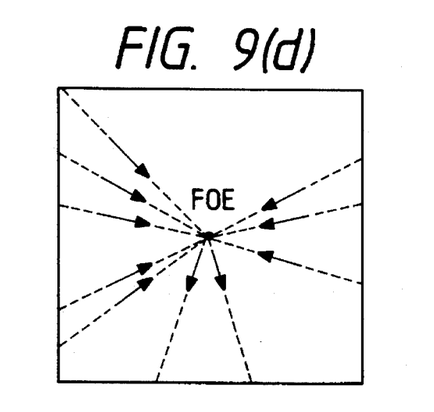

Let it now be assumed that the driver's motor vehicle is moving straight ahead on a flat road. If the video camera is focused on a road sign and a building such as shown in FIG. 9(a), then images such as shown in FIGS. 9(b) and 9(c) are taken at a time t and at a time t+Δt as the time elapses. When corresponding points in these two images are searched and connected, speed vectors such as shown in FIG. 9(d) can be obtained. As noted above, these vectors are termed "optical flows." As shown in FIG. 9(d), when a following vehicle closes in on the driver's own motor vehicle, a direction of the speed vector becomes opposite to the other optical flows unlike embodiment shown in FIG. 2. Otherwise, the method for calculating the rate of danger is analogous to that of the previous embodiment, so that a more detailed explanation thereof is omitted.

As described in the foregoing pages, the invention can determine the presence of an obstacle in the front, side or rear of a motor vehicle, or determine the rate of danger automatically, thereby ensuring the safety of the driver of the motor vehicle.

Particularly, the invention is characterized by determining the rate of danger by the magnitude of an optical flow derived from a point on a nearby motor vehicle or obstacle. That is, a video camera for imaging a front, side or rear view from a moving motor vehicle is provided, which does not particularly require a range finder for measuring the distance to the nearby motor vehicle or obstacle. As a result, an inexpensive apparatus can be achieved.

Further, the features such as reduction in calculation volume, elimination of wasteful processing, and limiting processing to certain zones contribute to increasing the processing speed, thereby making realtime processing possible.

Still further, advantages such as giving an appropriate alarm upon determination of a dangerous zone and the rate of danger thereof can be provided.

The foregoing description of preferred embodiments of the invention has been presented for purposes of illustration and description. It is not intended to be exhaustive nor to limit the invention to the precise form disclosed, and modifications and variations are possible in light of the above teachings or may be acquired from practice of the invention. The embodiments were chosen and described in order to explain the principles of the invention and its practical application, to enable one skilled in the art to utilize the invention in various embodiments and with various modifications as are suited to the particular use contemplated.

What is claimed is:

1. A method for detecting obstacles in the path of a moving vehicle, comprising the steps of:

imaging a view from the moving vehicle as at least two image frames, a first frame of the two image frames being taken at a first time and a second frame of the two image frames being taken at a succeeding time;

targeting a point in the first frame;

defining a location in the first frame for a long and narrow window encompassing the targeted point in a predetermined relationship and extending in a radial direction relative to a focus of expansion in the first frame;

establishing a location in the second frame for the long and narrow window by (i) stepwise moving the window in the radial direction while calculating a sum of absolute values of differences in luminance between the window in the first frame and the window in the second frame, and (ii) determining where the calculated sum attains a minimum value;

ascertaining a point in the second frame corresponding to the targeted point based on the location of the window in the second frame by utilizing the predetermined relationship;

defining an optical flow vector as a displacement measured from the targeted point to the corresponding point; and utilizing a magnitude and a positioning of the optical flow vector relative to the focus of expansion to determine a degree of danger for the moving vehicle.

2. A method for detecting obstacles in the path of a moving vehicle, comprising the steps of:

using a video camera to capture a view from the moving vehicle as at least two image frames, a first frame of the two image frames being taken at a first time and a second frame of the two image frames being taken at a succeeding time;

targeting points in the first frame;

detecting displacements of the targeted points in the second frame as respective optical flow vectors;

removing optical flow vectors resulting from a lane-dividing line or a character drawn on a road surface by:
(i) determining a height measured from the line or the character to the video camera, and (ii) deleting those optical flow vectors for which the determined height coincides with a height of the video camera to the road surface; and utilizing magnitudes and positionings relative to a focus of expansion of remaining optical flow vectors to determine a degree of danger for the moving vehicle.

3. A method for detecting obstacles in the path of a moving vehicle, comprising the steps of:

using a video camera to capture a view from the moving vehicle as at least two image frames, a first frame of the two image frames being taken at a first time and a second frame of the two image frames being taken at a succeeding time;

targeting points in a processing area of the first frame;

detecting displacements of the targeted points in the second frame as respective optical flow vectors;

dividing the processing area into a plurality of zones;

for each of the zones, weighting a sum of magnitudes of the optical flow vectors present in each of the zones on a zone basis; and determining a degree of danger for the moving vehicle from the weighted sum calculated for each of the zones.

4. The method according to claim 3, wherein said determining step comprises:

setting a respective, predetermined threshold for each of the zones; and if the weighted sum in at least one of the zones exceeds the predetermined threshold for that one zone, judging that the moving vehicle is in a dangerous situation.

5. The method according to claim 3, wherein said determining step comprises:

for each of the zones, setting plural, predetermined thresholds of differing levels; and for each of the zones, determining the degree of danger based on which of the thresholds is exceeded by the weighted sum for that zone.

6. The method according to claim 5, further comprising the step of:

outputting an alarm in accordance with the determined degree of danger.

7. A method for detecting obstacles in a vicinity of a moving vehicle, comprising the steps of:

imaging a view from the moving vehicle as at least two image frames, a first frame of the two image frames being taken at a first time and a second frame of the two image frames being taken at a succeeding time;

targeting a point in the first frame;

defining a location in the first frame for a long and narrow window encompassing the targeted point in a predetermined relationship and extending in a radial direction relative to a focus of expansion in the first frame;

establishing a location in the second frame for the long and narrow window by (i) stepwise moving the window in the radial direction while calculating a sum of absolute values of differences in luminance between the window in the first frame and the window in the second frame, and (ii) determining where the calculated sum attains a minimum value;

ascertaining a point in the second frame corresponding to the targeted point based on the location of the window in the second frame by utilizing the predetermined relationship;

defining an optical flow vector as a displacement measured from the targeted point to the corresponding point;

selecting the optical flow vector only if the optical flow vector defines a displacement away from the focus of expansion; and if said selecting step yields a selected optical flow vector, utilizing a magnitude and a positioning of the selected optical flow vector relative to the focus of expansion to determine a degree of danger for the moving vehicle.

8. The method according to claim 7, wherein the view imaged from the moving vehicle is a rear view.

9. The method according to claim 7, wherein the view imaged from the moving vehicle is a side view.

* * * * *